Figure 1:
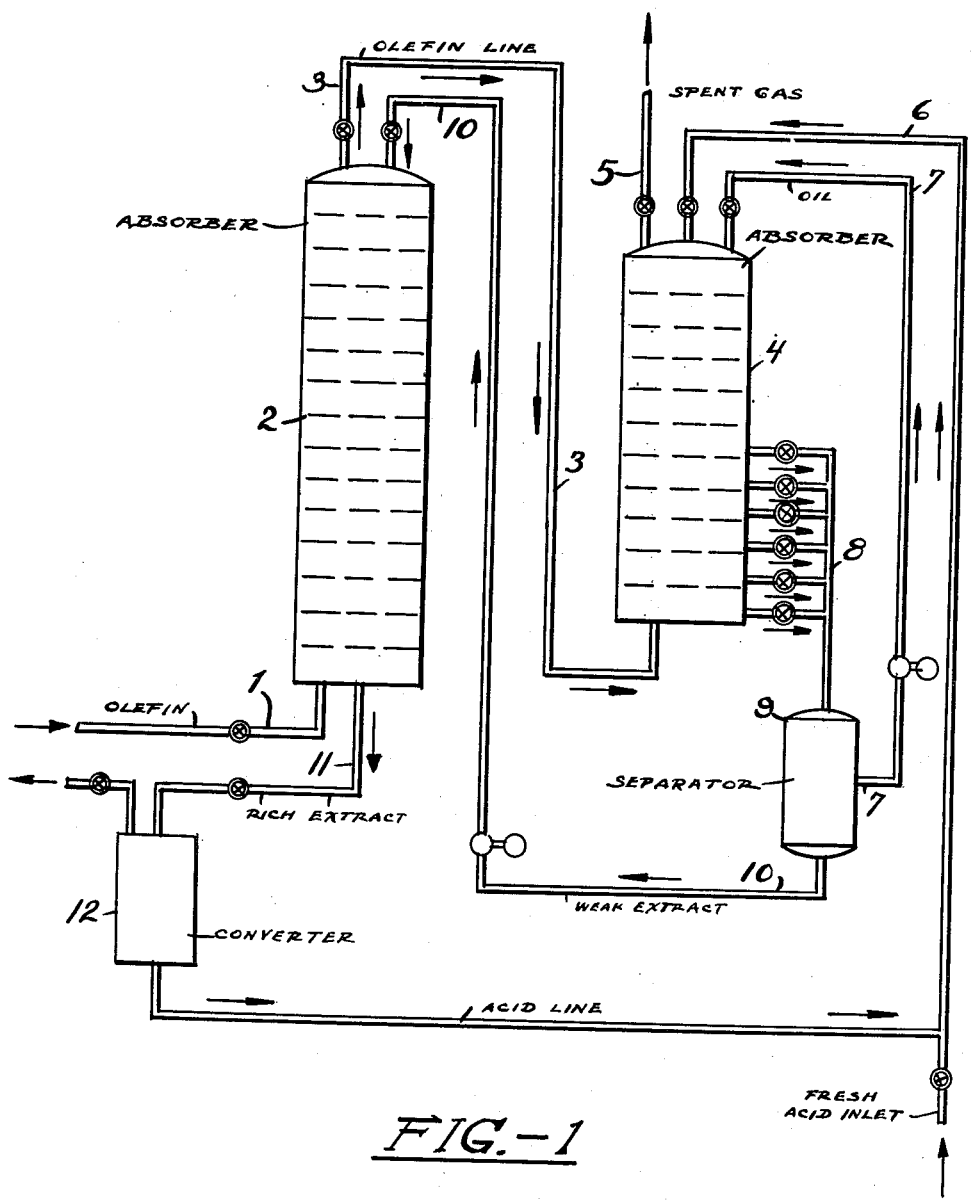

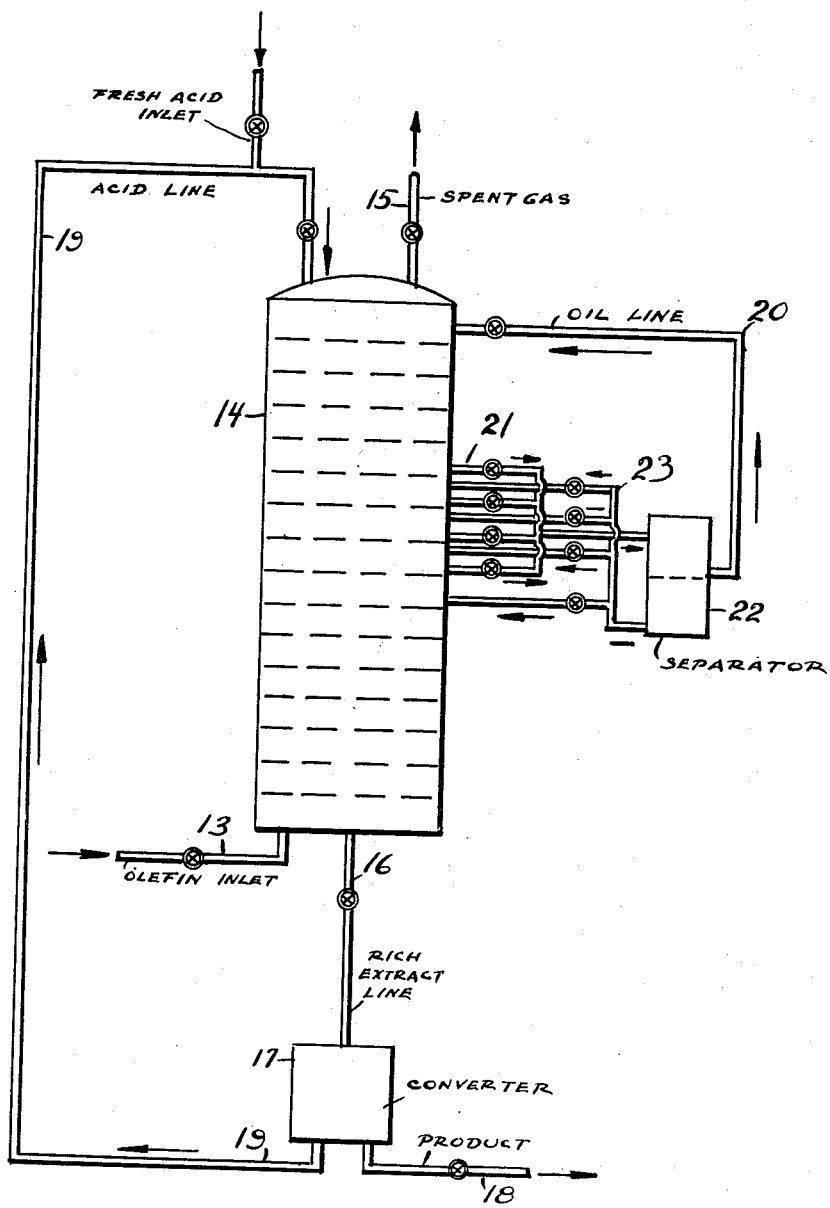

Patented June 6, 1944

2,350,558

UNITED STATES PATENT OFFICE 2,350,558

PRODUCTION OF ALCOHOLS

William J. Kerns, Rahway, and Helmuth G. Schneider, Roselle, N. J., assignors to Standard Alcohol Company, a corporation of Delaware Application January 1, 1942, Serial No. 425,380

4 Claims. (Cl. 260—460)

The present invention relates to improvements in the process for the production of olefin extracts. Alcohols and other compounds such as ethers etc. are formed from the olefins contained in the various refinery gases and naphthas by hydrating the olefins either in the liquid or gaseous phase with sulfuric acid. The present invention deals particularly with the vapor phase reaction. It has been the practice for some time to perform this vapor phase absorption of olefin in sulfuric acid in the presence of a contact medium such as a liquid paraffinic oil. The reaction is carried out in an absorption tower, a mixture of oil and acid in the ratio of from 1 to 5 parts by volume of oil per part by volume of sulfuric acid being conducted into the top of the tower and the vaporous hydrocarbons containing olefinic hydrocarbons being conducted into the bottom of the tower and permitted to flow up through the mixture of oil and acid to an outlet at the top of the tower. It has been contended on behalf of the use of an inert hydrocarbon oil as the contact medium in olefin absorption that better contact between the absorption medium and the olefin and therefore a better absorption is secured thereby. Since the most efficient operation of such a process depends upon obtaining a maximum rate of absorption of olefin with the acids and also obtaining a maximum absorption of olefins per unit of acid, it is obvious that any process which would enhance the absorption of olefins per unit quantity of acids would be very beneficial. It is an object of the present invention to secure a more efficient process for the production of acid extracts from olefin hydrocarbons by producing a more highly saturated acid extract.

Contrary to the prior belief, it has now been found that the presence of paraffinic oils in the absorption medium prevents the production of a completely saturated extract in the vapor phase process of absorbing olefins as illustrated by the following results where a pure olefin was absorbed in identical concentrations of sulfuric acid at constant temperature and pressure, but with and without the presence of a paraffinic oil. The results are expressed as molar concentrations of olefin per mol of sulfuric acid.

Extract saturation
With oil mixed with the absorption medium_____ 1.32
Absorption medium without oil_____ 1.46

It has now been further found that the effect of oil is largely dependent upon the saturation of the acid extract which is to say that the oil has its greatest effectiveness at low extract saturations and its effect decreases progressively with increasing extract saturation reaching a minimum at the concentration of approximately .8 to 1 mol of olefin per mol of sulfuric acid after which its presence becomes distinctly detrimental in that it retards the rate of olefin absorption and prevents the obtainance of a saturated extract under the conditions of temperature, pressure, acid concentration and percentage olefin in the feed stock existing in the absorber.

The rate at which olefins are absorbed by an absorption medium is best expressed as the quotient (K=absorption constant) obtained by dividing the number of cubic feet of olefin absorbed by the product of the number representing the average olefin concentration, time in hours and number of cubic feet of absorption medium. Thus $$\frac{V}{a.t.V'} = K \text{ (absorption constant)}$$

V=cubic feet of olefin absorbed
$a$=average olefin concentration
$t$=time in hours
V'=cubic feet of absorption medium In this formula the higher absorption constants denote a more rapid rate of olefin absorption.

In order to determine the optimum oil-acid ratio as well as the general effect of the oil-acid ratio upon the absorption of olefins, a series of tests using varying amounts of oil in the acid absorption medium under the following conditions were run:

Absorption conditions

Saturation of feed extract_____ 0.403
Acid strength of feed acid_____per cent__ 88
Temperature _____°C__ 20
Olefin content of C₄ naphtha__per cent__ 13.3
Pressure _____ Atmospheric

| Volume oil—volume acid | Saturation of extract out | Linear velocity of gas through absorber | Absorption constant K |
|---|---|---|---|
| No oil | 0.454 | 4.14 | 2.88 |
| 0.5 | 0.493 | 4.23 | 3.01 |
| 1.0 | 0.654 | 4.28 | 9.15 |
| 2.0 | 0.625 | 4.33 | 7.12 |
| 3.0 | 0.620 | 4.30 | 5.64 |

These tests indicate that for the absorption of olefins in an acid medium, an oil-acid ratio of at least 1:1 should be maintained where the extract saturation is low.

Having determined the most favorable oil:acid ratio the tests were continued using a more concentrated extract as the absorption medium, varying the rate at which the olefins were introduced into the absorber and at atmospheric and 15 lbs./sq. in. gauge pressure to show the effect of oil on the extraction of secondary butylenes from $C_4$ naphtha with the following results:

*Absorption conditions*

Saturation of feed extract _____ 1.050
Acid strength _____per cent__ 88
Secondary olefin content of feed naphtha
                                per cent__ 32
Temperature _____ °C__ 25

ATMOSPHERIC PRESSURE

|  | Saturation of extract out | Linear velocity of gas through absorption | Absorption constant K |
|---|---|---|---|
| No oil | 1.108 | 8.1 | 0.08 |
| 1 volume oil:1 volume acid | 1.063 | 7.3 | 0.016 |
| No oil | 1.135 | 20.3 | 0.28 |
| 1 volume oil:1 volume acid | 1.103 | 22.8 | 0.18 |
| No oil | 1.141 | 52.1 | 0.75 |
| 1 volume oil:1 volume acid | 1.065 | 50.4 | 0.13 |

15 LBS./SQ. IN. (GAUGE) PRESSURE

|  | Saturation of extract out | Linear velocity of gas through absorption | Absorption constant K |
|---|---|---|---|
| No oil | 1.290 | 10.2 | 0.83 |
| 1 volume oil:1 volume acid | 1.258 | 10.4 | 0.71 |
| No oil | 1.228 | 19.9 | 1.17 |
| 1 volume oil:1 volume acid | 1.152 | 27.3 | 0.92 |
| No oil | 1.150 | 51.6 | 1.74 |
| 1 volume oil:1 volume acid | 1.105 | 35.6 | 0.68 |

Similar results have been secured in the absorption of propylene from mixtures of $C_2$ and $C_3$ hydrocarbons using 92% acid as the absorption medium at atmospheric pressure and 25° C. as is shown below:

| Volume of oil— volume of acid | Saturation of extract out | Linear velocity of gas through absorption | Absorption constant K |
|---|---|---|---|
| No oil | 0.1 | 0.171 | 1.95 |
| 3:1 | 0.1 | 0.181 | 13.2 |
| No oil | 0.555 | 0.174 | 0.98 |
| 3:1 | 0.555 | 0.179 | 9.42 |
| No oil | 1.057 | 3.6 | 1.725 |
| 2:1 | 1.091 | 3.6 | 1.348 |

In the accompanying drawings Figure I illustrates in diagrammatic manner an apparatus adapted to carry out the process disclosed herein and Figure II is a modification thereof.

Referring to Figure I, olefin from any convenient source is introduced through pipe 1 into absorber 2, which is a tower of either the packed or bubble plate type, where the olefin comes in contact with the absorption medium which is of diminishing saturation as the top of the tower is approached. The olefin leaves absorber 2 through pipe 3 from which it is introduced into absorber 4, which is a contact tower of the bubble plate type, where the olefin contacts a mixture of paraffin oil, acid and extract of low saturation. The spent gas is removed from absorber 4 through outlet pipe 5. The absorption medium, usually sulfuric acid of from 50 to 95% acid concentration, depending upon the type of olefin to be absorbed, is introduced into the top of absorber 4 through pipe 6 together with from 1 to 3 volumes of oil per volume of acid, the oil being introduced into the top of absorber 4 through pipe 7. It is also possible to emulsify the oil and acid before introduction into tower 4 or put acid and oil in through the same pipe.

The mixture of oil and absorption medium flows down through absorber 4 in countercurrent contact with the ascending gases. The absorber 4 is equipped with draw-off lines 8 providing outlets for a sufficient number of individual plates that the mixture of extract and oil can be withdrawn from the absorber at the point where the presence of the oil no longer exerts a beneficial effect. The mixture of oil and weak acid extract passes through outlet 8 into separator 9. In the separator the oil and acid extract are permitted to stratify, the upper layer of oil being returned to the top of absorber 4 through pipe 7. The weak extract which forms the bottom layer in the separator is pumped through line 10 to the top of absorber 2 where it becomes saturated for the temperature and pressure conditions maintained within the tower by countercurrent contact with additional olefin. The saturated extract is removed from absorber 2 and passed through pipe 11 to convertor 12, where the extract is processed to produce the desired product and recovered acid. The recovered acid may or may not, as necessity dictates, be reconditioned prior to recycling to absorber 4 through line 6. One advantage to this type of operation is that the absorption conditions, such as temperature and pressure in towers 2 and 4 need not necessarily be the same.

Referring to Figure II olefin enters absorber 14 through pipe 13 passing upwardly through the tower in contact with absorption medium to be eventually removed from the tower through pipe 15. The tower 14 is a bubble plate type of absorption tower. A mixture of absorption medium and oil is introduced into the top of the tower separately through pipes 19 and 20 respectively or as a mixture in one line where the mixture comes in contact with the ascending gases. The tower is equipped with draw-off lines 21 on several of the individual plates of the tower. These draw-off lines are provided to make it convenient to withdraw the mixture of oil, acid, and acid extract at the point where the presence of the oil is no longer beneficial to the absorption of olefin. The mixture is conveyed to separator 22 where the oil and acid extract are separated, the oil being returned to the top of the tower through pipe 20. The acid extract is returned to the tower through line 23 and introduced into the tower on the plate below the plate from which the mixture of oil and acid extract was withdrawn. The acid extract is then contacted with further olefin and is withdrawn from the bottom of the tower in a saturated condition. The saturated extract passes through pipe 16 to convertor 17 where the desired products are recovered and withdrawn through pipe 18. The residual acid from convertor 17 either with or without further reconditioning is recycled to the tower through pipe 19.

It will be understood that the process of this invention may be carried out at superatmospheric pressure, the pressure being dependent upon the temperature used for absorption. The pressure is adjusted to maintain the reacting olefin substantially in the vapor phase.

What is claimed is:

1. A process for producing saturated acid extracts which comprises absorbing an olefin in an absorption medium consisting of a mixture of sulfuric acid of from 50 to 95% acid concentration with at least equal parts of a paraffinic oil, until the ratio of olefin to absorbent is at least 0.8:1 on a mol per mol basis, removing the paraffinic oil and completely saturating the sulfuric acid with olefin.

2. A process for producing concentrated acid extracts which comprises absorbing butenes in an absorption medium consisting of a mixture of sulfuric acid of from 70 to 95% acid concentration with at least equal parts of a paraffinic oil, until the ratio of olefin to absorbent in the extract is at least 0.8:1 on a mol per mol basis, removing the paraffinic oil and completely saturating the sulfuric acid with butene.

3. A process for producing concentrated acid extracts which comprises absorbing butenes in an absorption medium consisting of a mixture of sulfuric acid of 88% acid concentration with an equal volume of paraffinic oil, until the ratio of butene to absorbent is at least 0.8:1 on a mol per mol basis, removing the paraffinic oil and completely saturating the sulfuric acid with butene.

4. A process for producing concentrated acid extract which comprises absorbing propylene in an absorption medium consisting of a mixture of one volume of 85–95% sulfuric acid with three volumes of a paraffinic oil, until the ratio of olefin to absorbent is at least 0.8:1 on a mol per mol basis, removing the paraffinic oil and completely saturating the sulfuric acid with propylene.

WILLIAM J. KERNS.
HELMUTH G. SCHNEIDER.